(12) United States Patent
Moriwaka et al.

(10) Patent No.: US 11,770,235 B2
(45) Date of Patent: Sep. 26, 2023

(54) TIME SYNCHRONIZATION OF CONTROLLER

(71) Applicant: KABUSHIKI KAISHA YASKAWA DENKI, Kitakyushu (JP)

(72) Inventors: Ryota Moriwaka, Fukuoka (JP);
Kunihiko Ogawa, Fukuoka (JP);
Takayuki Nakamura, Fukuoka (JP);
Norihito Mizuguchi, Fukuoka (JP)

(*) Notice: Subject to any disclaimer, the term of this patent is extended or adjusted under 35 U.S.C. 154(b) by 36 days.

(21) Appl. No.: 17/673,805

(22) Filed: Feb. 17, 2022

(65) Prior Publication Data
US 2022/0278818 A1 Sep. 1, 2022

(30) Foreign Application Priority Data
Feb. 26, 2021 (JP) ................................. 2021-030211

(51) Int. Cl.
*H04L 7/00* (2006.01)
*H04J 3/06* (2006.01)

(52) U.S. Cl.
CPC .......... *H04L 7/0012* (2013.01); *H04J 3/0635* (2013.01)

(58) Field of Classification Search
CPC ............................. H04L 7/0012; H04J 3/0635
See application file for complete search history.

(56) References Cited

U.S. PATENT DOCUMENTS

| | | |
|---|---|---|
| 5,052,030 A | 9/1991 | Ernst et al. |
| 6,236,623 B1 | 5/2001 | Read et al. |
| 9,813,173 B2 * | 11/2017 | Achanta ................ H04J 3/0644 |
| 10,887,038 B2 * | 1/2021 | Liu ........................... G06F 1/10 |
| 11,128,392 B2 * | 9/2021 | Wen ...................... H04J 3/0667 |
| 11,166,250 B2 * | 11/2021 | Dickie .................. H04J 3/0638 |

(Continued)

FOREIGN PATENT DOCUMENTS

| | | |
|---|---|---|
| EP | 2288070 | 2/2011 |
| JP | 2002-139585 | 5/2002 |

(Continued)

OTHER PUBLICATIONS

Soei Patent and Law Firm, Statement of Related Matters, dated Feb. 28, 2022.

(Continued)

*Primary Examiner* — Chandrahas B Patel
(74) *Attorney, Agent, or Firm* — SOEI PATENT & LAW FIRM

(57) ABSTRACT

A controller includes circuitry configured to: synchronize a master clock with an external global clock and set a master time based on the master clock; synchronize a controller clock with the master clock and perform time synchronization to synchronize a controller time based on the controller clock with the master time; transmit controller time data indicating the synchronized controller time to at least one local device; set a plurality of time windows corresponding to a plurality of clock cycles of a clock signal for the time synchronization; determine whether one clock cycle of the plurality of clock cycles has started within one time window of the plurality of time windows, the one time window corresponding to the one clock cycle; and suspend the time synchronization corresponding to the one clock cycle, in response to determining that the one clock cycle has not started within the one time window.

20 Claims, 8 Drawing Sheets

(56) References Cited

U.S. PATENT DOCUMENTS

| | | |
|---|---|---|
| 2007/0124504 A1 | 5/2007 | McNealy et al. |
| 2009/0231191 A1 | 9/2009 | Wu et al. |
| 2010/0199003 A1 | 8/2010 | Kitamura et al. |
| 2011/0022734 A1 | 1/2011 | Etheridge et al. |
| 2012/0084062 A1 | 4/2012 | Maturana et al. |
| 2013/0212420 A1 | 8/2013 | Lawson et al. |
| 2014/0233590 A1 | 8/2014 | Someya et al. |
| 2015/0103831 A1 | 4/2015 | Chandhoke et al. |
| 2015/0346760 A1 | 12/2015 | Kishiro et al. |
| 2017/0012529 A1 | 1/2017 | Yamada et al. |
| 2018/0329451 A1 | 11/2018 | Handa |
| 2022/0147022 A1 | 5/2022 | Yoneda et al. |
| 2022/0413474 A1 | 12/2022 | Nishiyama et al. |

FOREIGN PATENT DOCUMENTS

| | | |
|---|---|---|
| JP | 2005-229322 | 8/2005 |
| JP | 2006-313458 | 11/2006 |
| JP | 2007-263753 | 10/2007 |
| JP | 2010-061458 | 3/2010 |
| JP | 4840455 | 12/2011 |
| JP | 2012-211881 | 11/2012 |
| JP | 2013-083451 | 5/2013 |
| JP | 2017-022965 | 1/2017 |
| JP | 2017-052306 | 3/2017 |
| JP | 6392180 | 9/2018 |
| JP | 2018-191226 | 11/2018 |
| JP | 2019-016872 | 1/2019 |
| JP | 2020-149402 | 9/2020 |
| WO | 2014/199729 | 12/2014 |
| WO | 2021/002421 | 1/2021 |

OTHER PUBLICATIONS

Extended Search Report in corresponding European Application No. 22155885.1, dated Jul. 4, 2022.
Extended Search Report in corresponding European Application No. 22156032.9, dated Jul. 19, 2022.
Office Action issued in Japanese Patent Application No. P2021-030227 dated Jan. 4, 2023 (with English partial translation).

* cited by examiner

TIME SYNCHRONIZATION OF CONTROLLER

CROSS-REFERENCE TO RELATED APPLICATIONS

This application claims the benefit of priority from Japanese Patent Application No. 2021-030211, filed on Feb. 26, 2021, the entire contents of which are incorporated herein by reference.

BACKGROUND

Japanese Patent No. 4840455 discloses a field control system that synchronizes and executes computing for controlling a field device and data communication with the field device at a timing according to a timer clock based on a network time.

SUMMARY

A controller according to an aspect of the present disclosure includes a master clock; a controller clock; and circuitry, wherein the circuitry is configured to: synchronize the master clock with an external global clock and set a master time based on the master clock; synchronize the controller clock with the master clock and perform time synchronization to synchronize a controller time based on the controller clock with the master time; transmit controller time data indicating the synchronized controller time to at least one local device; set a plurality of time windows corresponding to a plurality of clock cycles of a clock signal for the time synchronization; determine whether one clock cycle of the plurality of clock cycles has started within one time window of the plurality of time windows, the one time window corresponding to the one clock cycle; and suspend the time synchronization corresponding to the one clock cycle, in response to determining that the one clock cycle has not started within the one time window.

A processor-executable method according to an aspect of the present disclosure includes: synchronizing a master clock in a controller with an external global clock and setting a master time based on the master clock; synchronizing a controller clock in the controller with the master clock and performing time synchronization to synchronize a controller time based on the controller clock with the master time; transmitting controller time data indicating the synchronized controller time to at least one local device; setting a plurality of time windows corresponding to a plurality of clock cycles of a clock signal for the time synchronization; determining whether one clock cycle of the plurality of clock cycles has started within one time window of the plurality of time windows, the one time window corresponding to the one clock cycle; and suspending the time synchronization corresponding to the one clock cycle, in response to determining that the one clock cycle has not started within the one time window.

A non-transitory computer-readable storage medium according to an aspect of the present disclosure stores processor-executable instructions to: synchronize a master clock in a controller with an external global clock and set a master time based on the master clock; synchronize a controller clock in the controller with the master clock and perform time synchronization to synchronize a controller time based on the controller clock with the master time; transmit controller time data indicating the synchronized controller time to at least one local device; set a plurality of time windows corresponding to a plurality of clock cycles of a clock signal for the time synchronization; determine whether one clock cycle of the plurality of clock cycles has started within one time window of the plurality of time windows, the one time window corresponding to the one clock cycle; and suspend the time synchronization corresponding to the one clock cycle, in response to determining that the one clock cycle has not started within the one time window.

DETAILED DESCRIPTION

In the following description, with reference to the drawings, the same reference numbers are assigned to the same components or to similar components having the same function, and overlapping description is omitted.

System Overview

Figure 1:
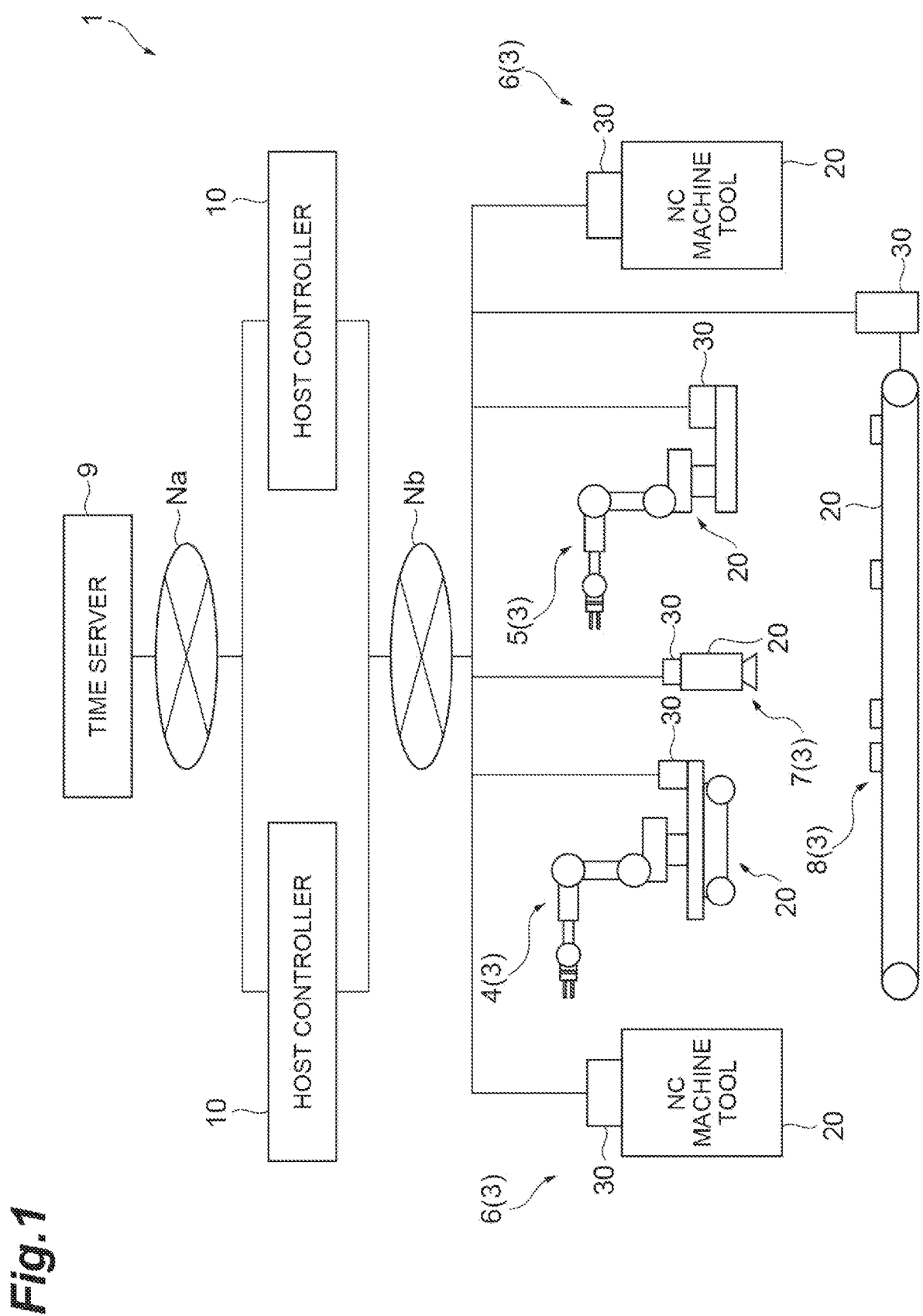
FIG. 1 is a diagram showing an overall configuration of an example device control system.

FIG. 1 is a diagram showing an overall configuration of a device control system 1 according to some examples. The device control system 1 is a mechanism for controlling a local device 3 placed in a real work environment (i.e., a field). In some examples, the device control system 1 includes at least one host controller 10 and at least one local device 3. Each host controller 10 transmits commands to at least one local device 3 to control the local device 3. One host controller 10 corresponds to at least one local device 3. A plurality of the host controller 10 may correspond to one local device 3.

The device control system 1 may include a plurality of types of local device 3. FIG. 1 shows a mobile robot 4, a stationary robot 5, an NC machine tool 6, an environmental sensor 7, and a conveyor 8 as examples of the local device 3. The mobile robot 4 is a robot that can travel autonomously. In some examples, the mobile robot 4 includes an automated guided vehicle that autonomously travels in accordance with movement commands, and a robot that performs work on a workpiece in accordance with work commands. The automated guided vehicle may be, for example, an electric AGV. The stationary robot 5 is a robot that is fixed in the work environment (e.g., to a floor). Both the mobile robot 4 and the stationary robot 5 may be a 6-axis vertical articulated robot, a 7-axis redundant robot having additional one axis joint, a so-called scalar articulated robot, or a so-called parallel link robot. In some examples, each of the mobile robot 4 and the stationary robot 5 has a tip portion, to which a tool corresponding to the purpose of processing is attached. Examples of tools include suction nozzles, robotic hands, machining tools, and welding guns.

The NC machine tool 6 is a device that performs machining such as cutting on a workpiece in accordance with machining commands. The environmental sensor 7 is a device that acquires information on the work environment in accordance with sensing commands. The environmental sensor 7 may be, for example, a camera that acquires images of the work environment or a temperature sensor that acquires temperatures of the work environment. The conveyor 8 is a device that conveys a workpiece in accordance with conveyance commands. Examples of the conveyor 8 include belt conveyors and roller conveyors.

In some examples, each local device 3 includes a device body 20 that performs main functions of the local device 3 and a local controller 30 that controls the device body 20. The local controller 30 controls the device body 20 in accordance with commands from the host controller 10, and transmits responses to the commands to the host controller 10. In this example, the local controller 30 is a component of the local device 3. As other examples, the local controller 30 itself may exist as the local device 3 in the device control system 1. The local controller 30 that controls the mobile robot 4 or the stationary robot 5 is also referred to as a robot controller.

In some examples, the device control system 1 synchronizes time between each host controller 10 and each local device 3 to operate each local device 3 based on periodic communication. In a case in which the periodic communication is applied, the host controller 10 outputs a command at a given cycle, and the local device 3 operates based on the command in that cycle. The local device 3 outputs a response to the host controller 10 in that cycle, and the host controller 10 acquires the response in that cycle.

In some examples, the device control system 1 acquires a global time based on an external global clock and performs the time synchronization based on the global time. For example, the host controller 10 connects to a time server 9 with the global clock via a first communication network Na and acquires a global time from the time server 9. The host controller 10 and the local device 3 are connected to each other through a second communication network Nb, and perform communications and controls based on the synchronized time based on the global time. Various methods such as Precision Time Protocol (PTP), generalized PTP (gPTP) and Time Sensitive Networking (TSN) may be adopted to realize the time synchronization in the device control system 1. The host controller 10 may acquire the global time by a device or method other than the time server 9.

Both the first communication network Na and the second communication network Nb may be wired networks, wireless networks, or a combination thereof. Both the first communication network Na and the second communication network Nb may be constructed in a manner that at least a part thereof includes a mobile communication system. In some examples, the first communication network Na and the second communication network Nb are networks employing non-periodic communication. In this example, the device control system 1 utilizes the second communication network Nb (i.e., the non-periodic communication) to perform the time synchronization between the host controller 10 and the local device 3, and further implements periodic communication. The periodic communication refers to a communication method in which information communication is performed at regular time intervals in accordance with a predetermined format. On the other hand, the non-periodic communication refers to a communication method in which a timing of data communication is not necessarily determined.

In some examples, processing in the host controller 10 that performs the time synchronization based on the global time is considered to stabilize the time synchronization in the device control system 1. For example, in the host controller 10, a clock cycle of a clock signal generated for the time synchronization may be disturbed by unexpected phenomena. Causes of the unexpected phenomena include, for example, noises, reflections, and voltage changes occurring on the bus. In a case in which a clock cycle has started at an unintended timing, the time corresponding to the clock cycle may be set at an incorrect timing. As a result, a clock in the host controller 10 may become inaccurate, and jitter (fluctuation of signal waveform) may occur in an internal signal (for example, an interrupt signal) generated based on a time indicated by the internal clock.

Figure 2:
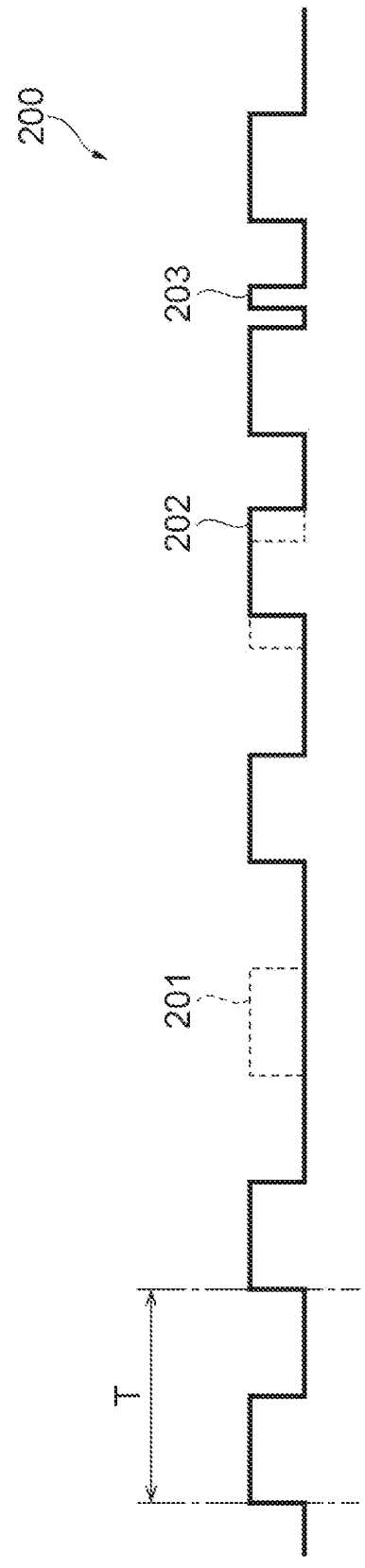
FIG. 2 is a diagram showing an example clock signal that may cause a time lag.

FIG. 2 is a diagram showing an example clock signal that may cause a time lag. A clock signal 200 shown in this example has a clock cycle T, and the start of each clock cycle is indicated by a rising edge of the signal. It should be noted that in the present disclosure, the start of the clock cycle may be indicated by the falling edge of the signal. FIG. 2 shows a lack of clock 201, clock deviation 202, and a noise 203 as examples of clock signal disturbances. The lack of clock is a phenomenon in which a clock that should be observed is not observed due to factors such as an unstable voltage and a decrease in amplitude. The clock deviation is a phenomenon observed when the clock is different from the original timing. The noise is an irregular wave that is not related to the cycle and timing of the clock signal.

In some examples, the device control system 1 has a mechanism for stabilizing the time synchronization even when unexpected phenomena such as those shown in FIG. 2 occurs. Since the accuracy of time synchronization is improved by the mechanism, it is possible to accurately perform various processes (for example, device control, response analysis, and the like) based on the unified time in the whole of the device control system 1. The mechanism may be realized by applying the controller according to an aspect of the present disclosure to the host controller 10.

In the present disclosure, the clock refers to a mechanism to continue indicating individual points in a time flow discretely or continuously along the flow. The timer indicating the lapse of time is a kind of clock. The time is a value indicating one point in the time flow. The time may be indicated with a general unit such as hour, minute, or second, or may be indicated by another method such as counter value or calendar value (system time). In the present disclosure, "time based on clock" refers to, for example, a time indicated by a clock.

Configuration of Host Controller

Figure 3:
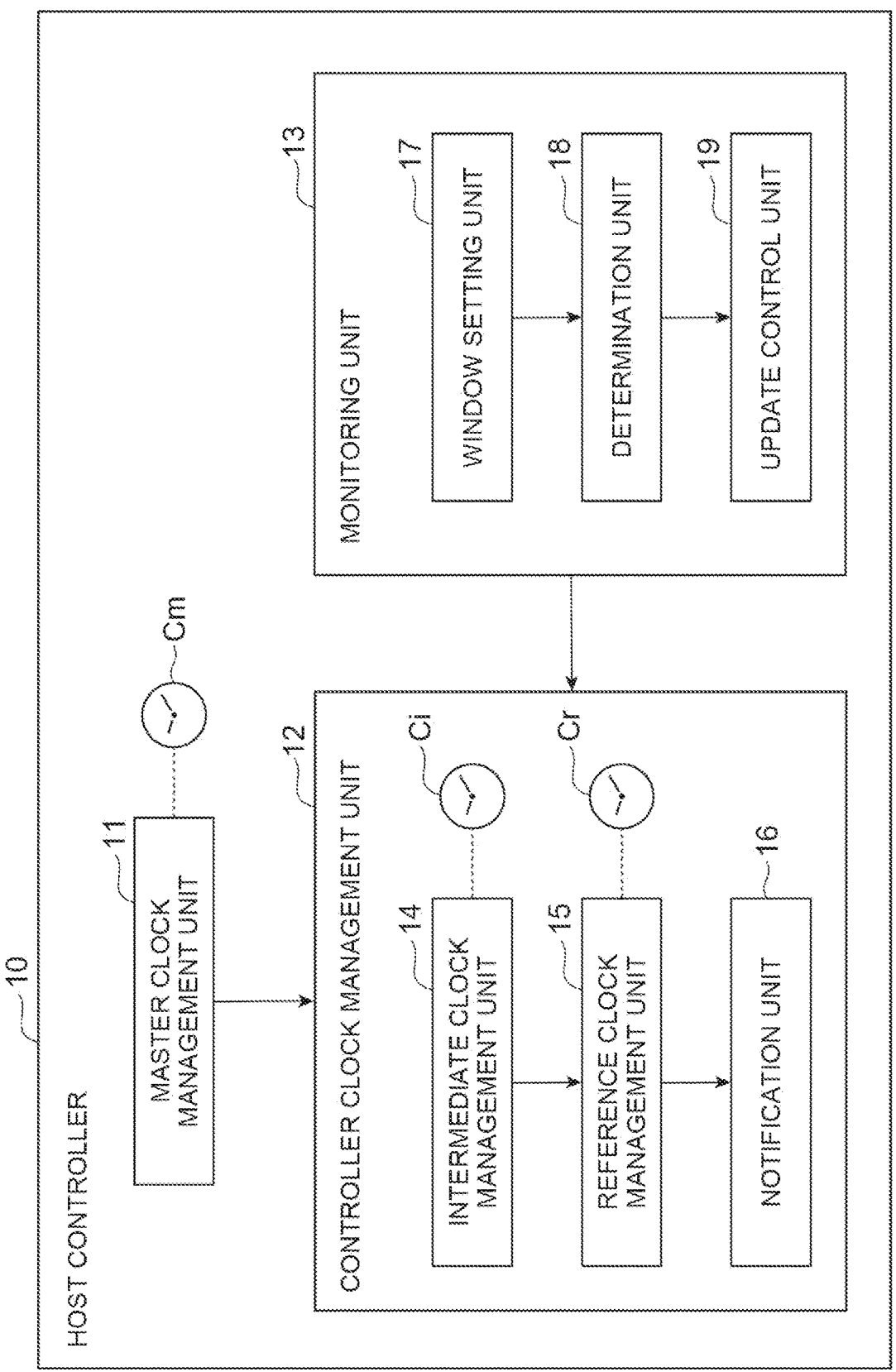
FIG. 3 is a diagram showing a functional configuration of an example host controller.

FIG. 3 is a diagram showing an example of a functional configuration of the host controller 10. In some examples, the host controller 10 has three types of internal clocks for the time synchronization. These internal clocks are a master clock Cm and two types of controller clocks: an intermediate controller clock Ci and a reference controller clock Cr. In some examples, the host controller 10 comprises a master clock management unit 11, a controller clock management unit 12, and a monitoring unit 13 as functional modules.

The master clock management unit 11 is a functional module that synchronizes the master clock Cm with the external global clock and sets a master time based on a master clock Cm. In some examples, the master clock management unit 11 receives the global time from the time server 9 via a first communication network (non-periodic communication) Na, performs the time synchronization based on the global time, and sets the master time. In some examples, the master clock management unit 11 receives global time data indicating the global time. The master clock management unit 11 generates a master clock signal corresponding to the master time and having a master clock cycle. The master clock signal is an example of the clock signal for the time synchronization.

The controller clock management unit 12 is a functional module that synchronizes the controller clock with the master clock Cm and performs the time synchronization for setting a controller time based on the controller clock. It can also be said that this time synchronization is processing for synchronizing the controller time with the master time. In some examples, the controller clock management unit 12 comprise an intermediate clock management unit 14, a reference clock management unit 15, and a notification unit 16.

The intermediate clock management unit 14 is a functional module that performs intermediate time synchronization. The intermediate time synchronization is processing of synchronizing the intermediate controller clock Ci with the master clock Cm based on the master clock signal and setting an intermediate controller time based on the intermediate controller clock Ci. It can also be said that the intermediate time synchronization is processing of synchronizing the intermediate controller time with the master time. The intermediate time synchronization is referred to as "first time synchronization" in Japanese Patent Application No. 2021-030211. The intermediate clock management unit 14 generates an intermediate clock signal corresponding to the intermediate controller time and having an intermediate clock cycle shorter than the master clock cycle. The intermediate clock signal is an example of the clock signal for the time synchronization. It can also be said that the intermediate clock signal is an example of the internal signal corresponding to the controller time and having a given internal cycle. In this case, it can be said that the intermediate clock management unit 14 generates the internal signal in an internal cycle shorter than the clock cycle (master clock cycle).

The reference clock management unit 15 is a functional module that performs reference time synchronization. The reference time synchronization is processing for synchronizing the reference controller clock Cr with the intermediate controller clock Ci based on the intermediate clock signal and setting a reference controller time based on the reference controller clock Cr. It can also be said that the reference time synchronization is processing of synchronizing the reference controller time with the intermediate controller time. The reference time synchronization is referred to as "second time synchronization" in Japanese Patent Application No. 2021-030211.

The notification unit 16 is a functional module that transmits the controller time to at least one local device through periodic communication using the second communication network Nb. In some examples, the notification unit 16 transmits controller time data indicating the controller time to the at least one local device through the periodic communication. For example, the notification unit 16 transmits the reference controller time. In some examples, the notification unit 16 transmits the synchronized reference controller time as the synchronized controller time.

The monitoring unit 13 is a functional module that monitors the time synchronization by the controller clock management unit 12 and intervenes in the time synchronization as needed. In some examples, the monitoring unit 13 comprise a window setting unit 17, a determination unit 18, and an update control unit 19.

The window setting unit 17 is a functional module that sets a time window for determining whether each clock cycle of the clock signal for the time synchronization has correctly started. For example, the window setting unit 17 sets a plurality of time windows corresponding to a plurality of clock cycles of the clock signal for the time synchronization. This time window may be represented by a time width. The window setting unit 17 sets a time window corresponding to an estimated start timing of each clock cycle. In some examples, the window setting unit 17 generates a time window to determine with respect to each master clock cycle and a time window to determine with respect to each intermediate clock cycle.

The determination unit 18 is a functional module that determines whether each clock cycle of the clock signal for the time synchronization has started within the time window. For example, the determination unit 18 determines whether one clock cycle of the plurality of clock cycles has started within one time window of the plurality of time windows. Here, the one time window corresponds to the one clock cycle. In some examples, the determination unit 18 determines whether each master clock cycle has started within a corresponding given time window. The determination unit 18 also determines whether each intermediate clock cycle has started within a corresponding given time window.

The update control unit 19 is a functional module that suspends the time synchronization corresponding to the clock cycle of the clock signal for the time synchronization in response to determining that the clock cycle has not started within the time window. "To suspend the time synchronization corresponding to the clock cycle" refers to not performing the time synchronization in the clock cycle. The fact that a certain clock cycle does not start within the time window means that the clock cycle is not normal. In a case in which the time synchronization is suspended, the time synchronization that has been performed every clock cycle is temporarily stopped, and the time synchronization is resumed from the next or later clock cycle. In some examples, in a case in which a certain master clock cycle has not started within the corresponding time window, the update control unit 19 suspends the intermediate time synchronization corresponding to the master clock cycle. In a case in which a certain intermediate clock cycle has not started within the corresponding time window, the update control unit 19 suspends the reference time synchronization corresponding to the intermediate clock cycle.

In a case in which the clock cycle of the clock signal for the time synchronization has started within the time window, that is, when the clock cycle is normal, the update control unit 19 causes the controller clock management unit 12 to perform the time synchronization corresponding to the clock cycle. In a case in which the master clock cycle has started within the corresponding time window, the intermediate clock management unit 14 performs the intermediate time synchronization corresponding to the master clock cycle. In a case in which the intermediate clock cycle has started within the corresponding time window, the reference clock management unit 15 performs the reference time synchronization corresponding to the intermediate clock cycle.

Figure 4:
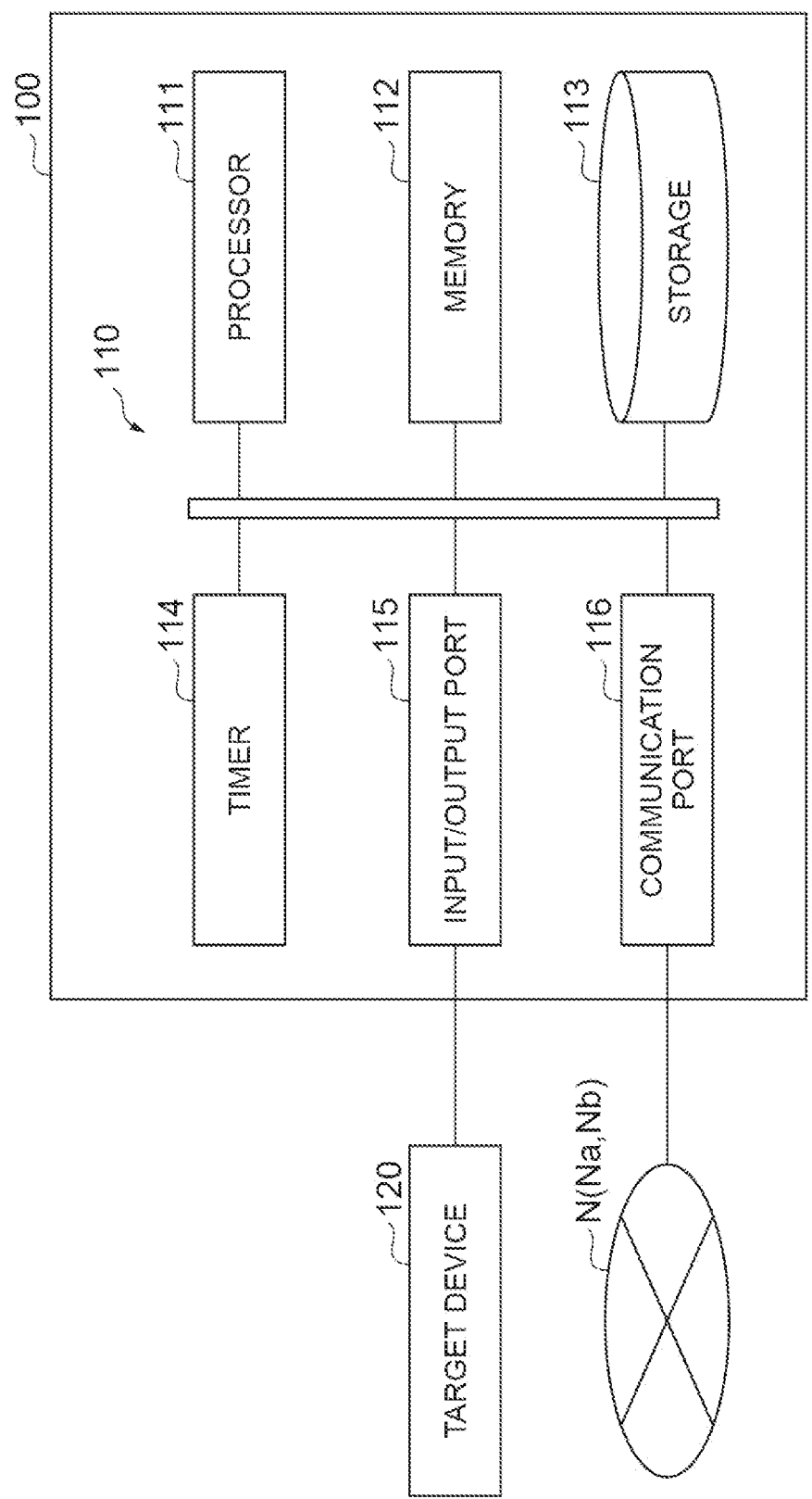
FIG. 4 is a diagram showing a hardware configuration of an example computer functioning as a host controller.

FIG. 4 is a diagram showing an example of a hardware configuration of a computer 100 functioning as the host controller 10. The computer 100 has circuitry 110. The circuitry 110 includes a processor 111, a memory 112, a storage 113, a timer 114, an input/output port 115, and a communication port 116. The number of each of these hardware elements may be one or two or more. The storage 113 records a program for configuring each functional module on the computer 100. The storage 113 is a computer-readable storage medium such as a hard disk, a nonvolatile semiconductor memory, a magnetic disk, or an optical disk. The memory 112 temporarily stores a program loaded from the storage 113, a calculation result of the processor 111, and so on. The processor 111 realizes each functional module by executing the program in cooperation with the memory 112. The input/output port 115 inputs and outputs electric signals to and from a target device 120 such as a device body, a monitor, or an input device in response to commands from the processor 111. The input/output port 115 may also serve to supply power to the device body. The communication port 116 performs data communication with another device via a communication network N (for example, at least one of the first communication network Na and the second communication network Nb) in accordance with commands from the processor 111.

System Operation

Figure 5:
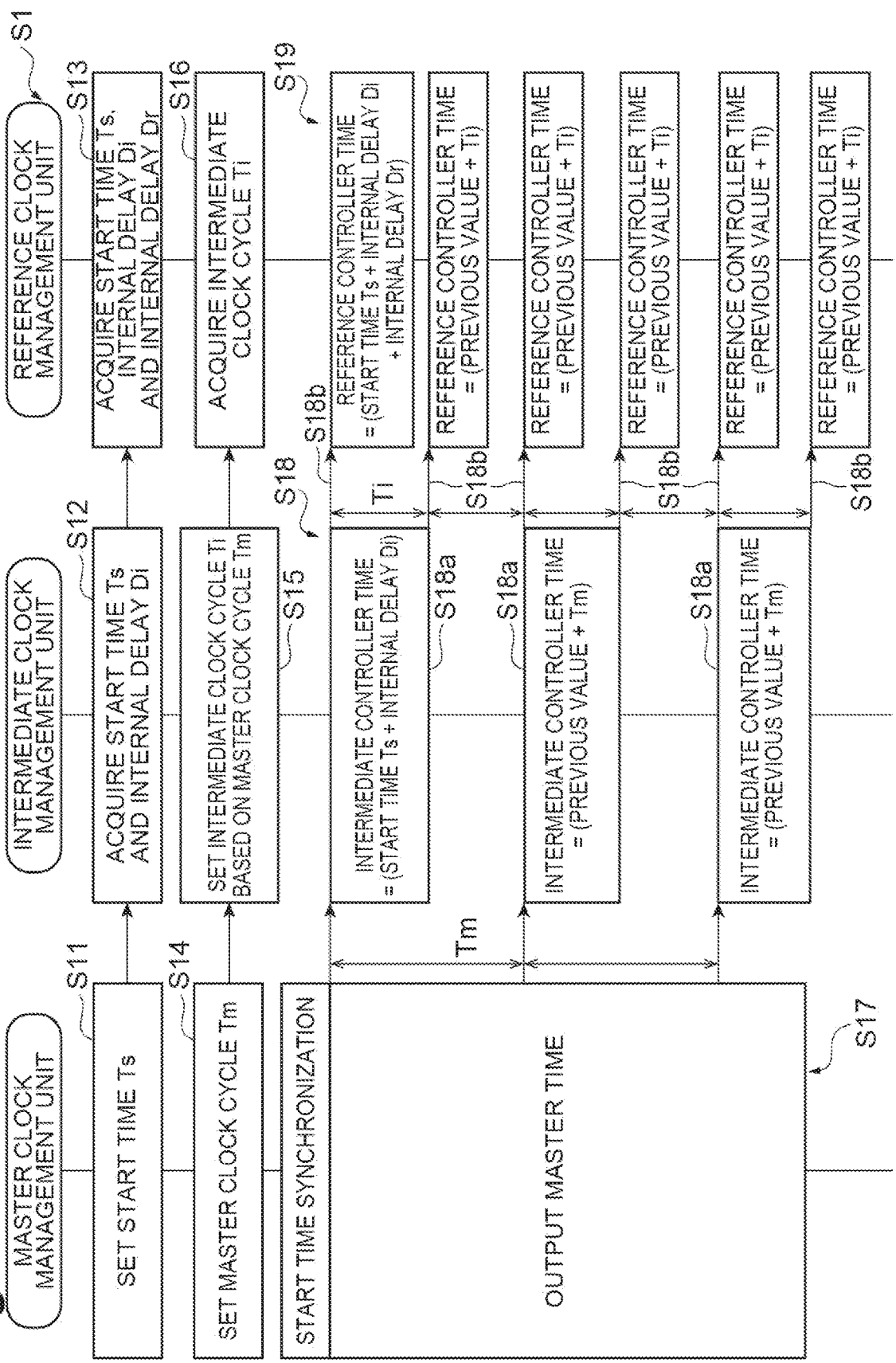
FIG. 5 is a sequence diagram showing an example operation of a device control system.
Figure 6:
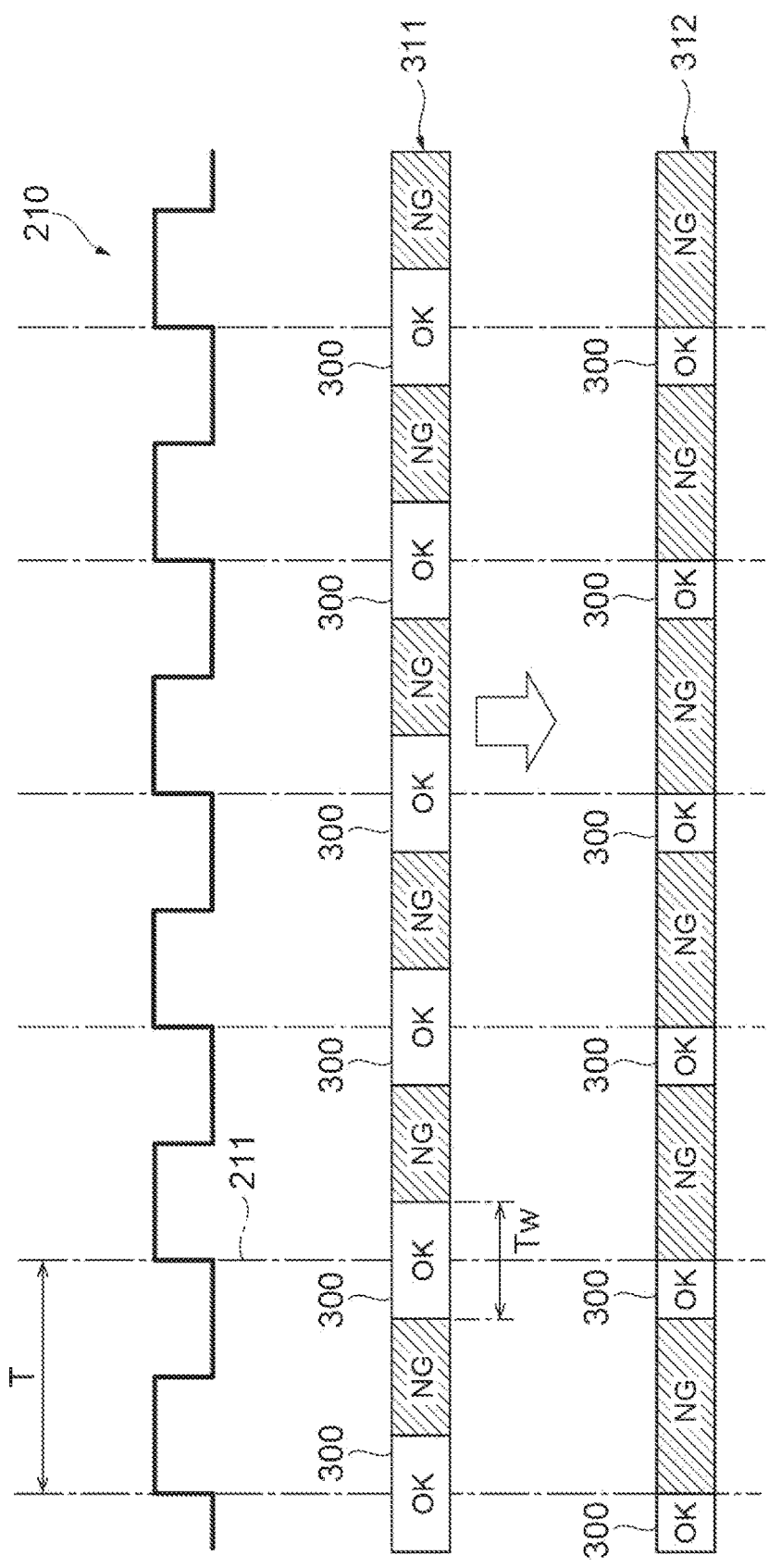
FIG. 6 is a diagram showing an example of setting of a time window.
Figure 7:
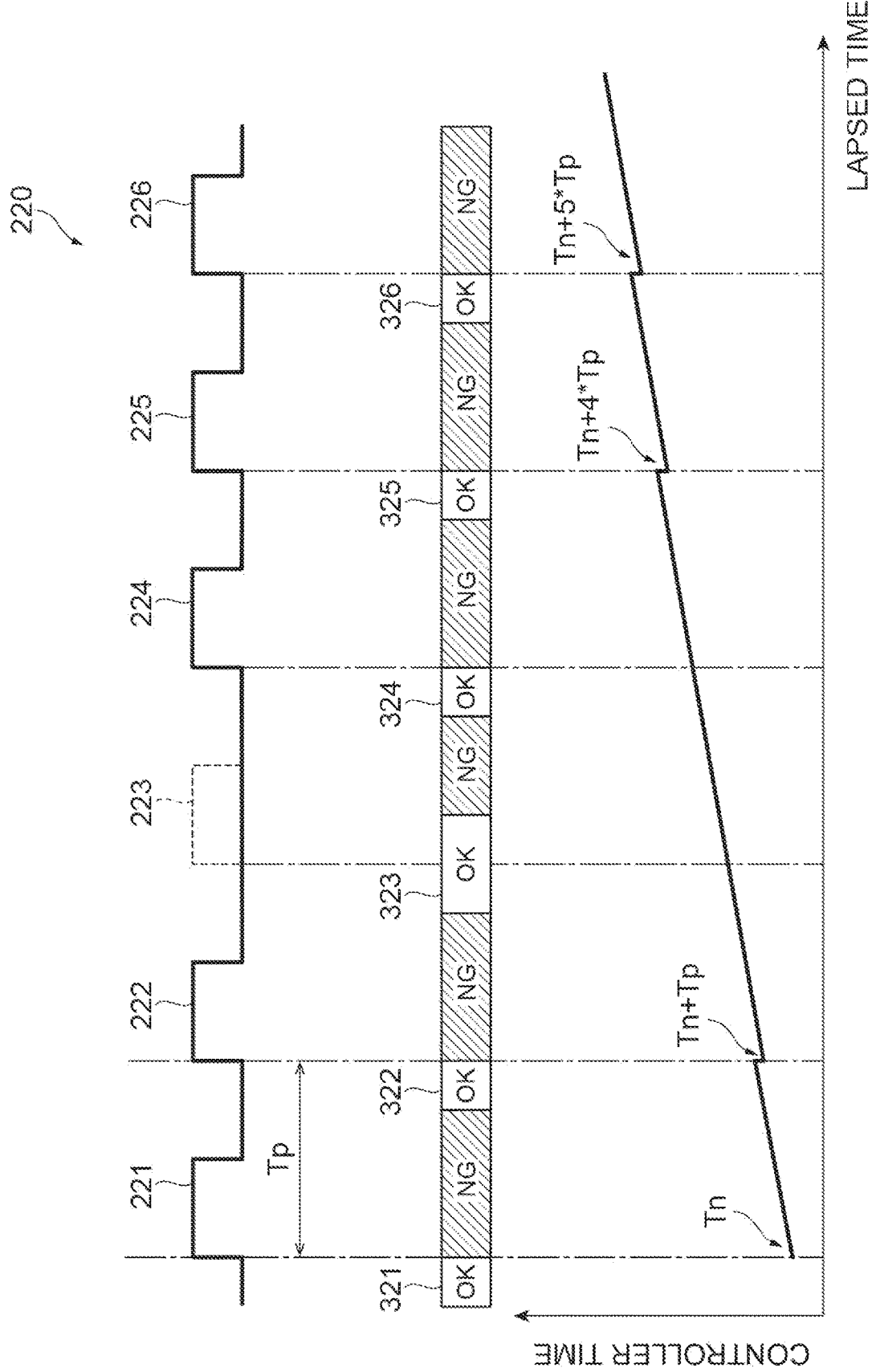
FIG. 7 is a diagram showing an example of monitoring and controlling time synchronization.
Figure 8:
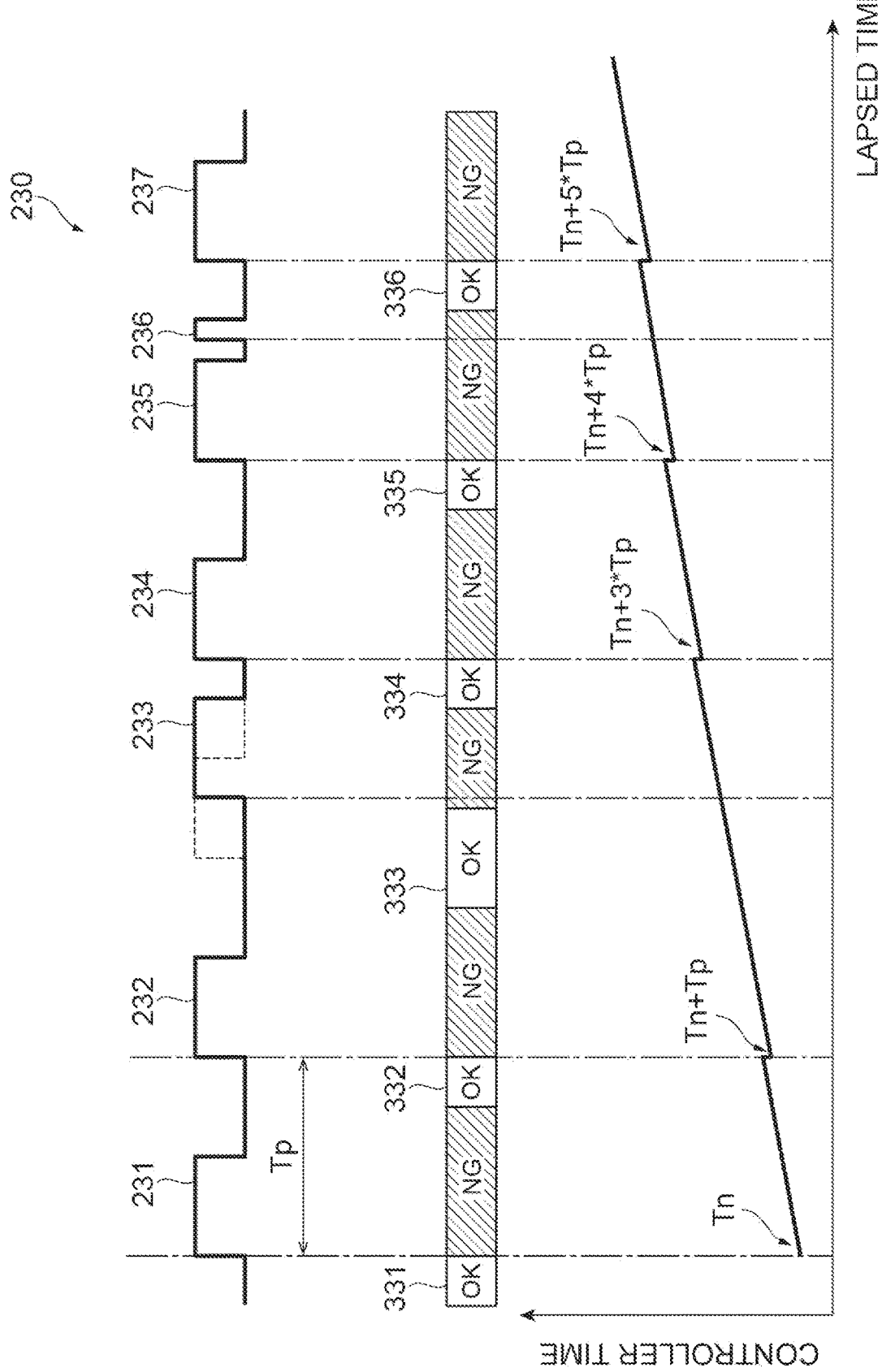
FIG. 8 is a diagram showing another example of monitoring and controlling time synchronization.

As some examples of the time synchronization method according to the present disclosure, an example operation of the host controller 10 will be described with reference to FIGS. 5 to 8. FIG. 5 is a sequence diagram showing an example operation of the host controller 10 as a process flow S1. That is, in some examples, the host controller 10 executes the process flow S1. FIG. 6 is a diagram showing an example of setting of the time window. FIGS. 7 and 8 are diagrams showing an example of monitoring and controlling the time synchronization.

Time Synchronization

The time synchronization in the host controller 10 will be described with reference to FIG. 5. In step S11, the master clock management unit 11 sets a start time Ts of the master clock Cm and outputs the start time Ts to the intermediate clock management unit 14. In step S12, the intermediate clock management unit 14 acquires the start time Ts, further acquires an internal delay Di associated with the intermediate clock management unit 14, and outputs these values to the reference clock management unit 15. In step S13, the reference clock management unit 15 acquires the start time Ts and the internal delay Di, and further acquires an internal delay Dr associated with the reference clock management unit 15.

In step S14, the master clock management unit 11 sets a master clock cycle Tm of the master clock signal and outputs the master clock cycle Tm to the intermediate clock management unit 14. In step S15, the intermediate clock management unit 14 sets an intermediate clock cycle Ti of the intermediate clock signal based on the master clock cycle Tm. In some examples, the intermediate clock management unit 14 sets the intermediate clock cycle Ti shorter than the master clock cycle Tm, for example, the intermediate clock cycle Ti which is 1/N times the master clock cycle Tm (N is an integer of two or more). The intermediate clock management unit 14 outputs the intermediate clock cycle Ti to the reference clock management unit 15. In a step S16, the reference clock management unit 15 acquires the intermediate clock cycle Ti.

Then, the master clock management unit 11, the intermediate clock management unit 14, and the reference clock management unit 15 cooperate to perform the time synchronization among the master clock Cm, the intermediate controller clock Ci, and the reference controller clock Cr. Hereinafter, a series of processing in the master clock management unit 11, the intermediate clock management unit 14, and the reference clock management unit 15 will be described as steps S17, S18, and S19, respectively.

In step S17, the master clock management unit 11 starts the time synchronization and outputs a master clock signal having the master clock cycle Tm to the intermediate clock management unit 14.

In step S18, the intermediate clock management unit 14 synchronizes the intermediate controller clock Ci with the master clock Cm based on the master clock signal. In this synchronization, the intermediate clock management unit 14 sets the sum of the start time Ts and the internal delay Di as the initial value of the intermediate controller time. The intermediate clock management unit 14 then updates the intermediate controller time by adding the master clock cycle Tm to the previous value of the intermediate controller time, in each master clock cycle Tm. FIG. 5 shows such initialization and updating of the intermediate controller time based on the master clock signal as step S18a. In step S18, the intermediate clock management unit 14 outputs the intermediate clock signal having the intermediate clock cycle Ti to the reference clock management unit 15. FIG. 5 shows the output a step S18b. It is noted that in some examples, step S18a and S18b are processes independent of each other.

In step S19, the reference clock management unit 15 synchronizes the reference controller clock Cr with the intermediate controller clock Ci based on the intermediate clock signal. In this synchronization, the reference clock management unit 15 sets the sum of the start time Ts, the internal delay Di, and the internal delay Dr (i.e., the sum of the intermediate controller time and the internal delay Dr) as the initial value of the reference controller time. The reference clock management unit 15 thereafter updates the reference controller time by adding the intermediate clock cycle Ti to the previous value of the reference controller time, in each intermediate clock cycle Ti.

As shown in steps S18 and S19, the controller clock management unit 12 (the intermediate clock management unit 14 and the reference clock management unit 15) may perform the time synchronization further based on the internal delay (e.g., at least one of the internal delays Di and Dr) in the host controller 10.

The notification unit 16 notifies or transmits the reference controller time to at least one local device 3 in a given communication cycle. The communication cycle may be longer, shorter, or the same as the clock cycle (the master clock cycle Tm or the intermediate clock cycle Ti) of the clock signal. The communication cycle may be synchronized with N or 1/N times of the clock cycle (N is an integer of two or more), or may be asynchronous with the clock cycle.

Setting of Time Window

An example of setting the time window will be described with reference to FIG. 6. This example shows a correct clock signal 210 with a correct clock cycle T. The process of setting the time window is common to both the master clock signal and the intermediate clock signal, and the clock signal 210 may correspond to each of the master clock signal and the intermediate clock signal. The start of each clock cycle of the clock signal 210 is indicated by a rising edge of the signal. In some examples, the window setting unit 17 sets, as a time window 300, a time width Tw from a time point before an estimated start timing 211 of the clock cycle to a time point after the estimated start timing 211. FIG. 5 shows a set of the time windows 300 provided in such a manner as a window sequence 311.

The window setting unit 17 may set the time width Tw based on the cycle of the clock signal 210. For example, the window setting unit 17 may set the time width Tw consisting of a length of ¼ of the cycle located before the estimated start timing 211 and a length of ¼ of the cycle located after the estimated start timing 211 (i.e., the time width Tw having a length of ½ of the cycle). Alternatively, the window setting unit 17 may set the internal cycle of the internal signal corresponding to the controller time as the time width Tw. The internal signal may be a clock signal (e.g., the intermediate clock signal) corresponding to the controller time to be synchronized, or may be another interrupt signal generated periodically. The internal cycle may therefore be a clock cycle (for example, the intermediate clock cycle) of the clock signal or a cycle of the interrupt signal.

The window setting unit 17 may further set a flag indicating whether the time window 300 is set. For example, the window setting unit 17 sets the flag for each of the plurality of time windows. With this flag, the determination unit 18 can recognize the presence of the time window 300 without considering the start, end, and length of the time window 300. In the example of FIG. 6, a value of the flag is either a value "OK" indicating that the time window 300 is set or a value "NG" indicating that the time window 300 is not set. The flag may be expressed by other two types of values. In a case in which the flag is set, the determination unit 18 refers to the flag at the start of the clock cycle to determine whether the clock cycle has started in the time window 300.

In some examples, the window setting unit 17 may set the end of the time window 300 based on the start time of the clock cycle, in response to determining that the clock cycle has started in the time window 300. It can be said that such termination setting is a process of changing the end from the initial setting. In the example shown as a window sequence 312, the window setting unit 17 sets (changes) the end of the time window 300 in response to the start of the clock cycle. The start of each the time window 300 is not changed.

Monitoring Time Synchronization

An example of monitoring and controlling the time synchronization will be described with reference to FIG. 7. In this example, the controller clock management unit 12 sets the controller time based on a clock signal 220 having a clock cycle Tp. This example shows processing common to the intermediate clock management unit 14 and the reference clock management unit 15.

The processing in a case in which the clock signal 220 is the master clock signal will be described. The clock cycle Tp therefore means the master clock cycle. The intermediate clock management unit 14 performs the intermediate time synchronization corresponding to a master clock cycle 221 started in a time window 321, and sets the intermediate controller time to Tn. The intermediate clock management unit 14 further performs the intermediate time synchronization corresponding to a master clock cycle 222 started in a next time window 322, and sets the intermediate controller time to (Tn+Tp). With respect to a next time window 323, the determination unit 18 determines that a master clock cycle 223 has not started in the time window 323, and the update control unit 19 suspends the intermediate time synchronization corresponding to the master clock cycle 223. A master clock cycle 224 has started in a next time window 324, but the update control unit 19 further suspends the intermediate time synchronization corresponding to the master clock cycle 224. The intermediate clock management unit 14 performs the intermediate time synchronization corresponding to a master clock cycle 225 started in a next time window 325, and sets the intermediate controller time to (Tn+4*Tp). The intermediate clock management unit 14 performs the intermediate time synchronization corresponding to a master clock cycle 226 started in a next time window 326 and sets the intermediate controller time to (Tn+5*Tp).

The processing in a case in which the clock signal 220 is the intermediate clock signal will be described. The clock cycle Tp therefore means the intermediate clock cycle. The reference clock management unit 15 performs the reference time synchronization corresponding to the intermediate clock cycle 221 started in the time window 321, and sets the reference controller time to Tn. The reference clock management unit 15 further performs the reference time synchronization corresponding to the intermediate clock cycle 222 started in the next time window 322, and sets the reference controller time to (Tn+Tp). With respect to the next time window 323, the determination unit 18 determines that the intermediate clock cycle 223 has not started in the time window 323, and the update control unit 19 suspends the reference time synchronization corresponding to the intermediate clock cycle 223. The intermediate clock cycle 224 has started in the next time window 324, but the update control unit 19 further suspends the reference time synchronization corresponding to the intermediate clock cycle 224. The reference clock management unit 15 performs the reference time synchronization corresponding to the intermediate clock cycle 225 started in the next time window 325, and sets the reference controller time to (Tn+4*Tp). The reference clock management unit 15 performs the reference time synchronization corresponding to the intermediate clock cycle 226 started in the next time window 326, and sets the reference controller time to (Tn+5*Tp).

In the example of FIG. 7, in responding to determining that the master clock cycle (or intermediate clock cycle) 324 has started in the time window 324, the update control unit 19 may cause the intermediate clock management unit 14 (or the reference clock management unit 15) to perform the time synchronization corresponding to the master clock cycle 224. In this case, the intermediate clock management unit 14 performs the intermediate time synchronization and sets the intermediate controller time to (Tn+3*Tp) (or the reference clock management unit 15 performs the reference time synchronization and sets the reference controller time to (Tn+3*Tp)).

Another example of monitoring and controlling the time synchronization will be described with reference to FIG. 8. In this example, the controller clock management unit 12 sets the controller time based on a clock signal 230 having the clock cycle Tp. This example also shows processing common to the intermediate clock management unit 14 and the reference clock management unit 15.

The processing in a case in which the clock signal 230 is the master clock signal will be described. The clock cycle Tp therefore means the master clock cycle. The intermediate clock management unit 14 performs the intermediate time synchronization corresponding to a master clock cycle 231 started in a time window 331, and sets the intermediate controller time to Tn. The intermediate clock management unit 14 further performs the intermediate time synchronization corresponding to a master clock cycle 232 started in a next clock cycle 332, and sets the intermediate controller time to (Tn+Tp). With respect to a next clock cycle 333, the determination unit 18 determines that a master clock cycle 233 has not started in the clock cycle 333, and the update control unit 19 suspends the intermediate time synchronization corresponding to the master clock cycle 233. The intermediate clock management unit 14 performs the intermediate time synchronization corresponding to a master clock cycle 234 started in a next time window 334 and sets the intermediate controller time to (Tn+3*Tp). The intermediate clock management unit 14 performs the intermediate time synchronization corresponding to a master clock cycle 235 started in a next time window 335, and sets the intermediate controller time to (Tn+4*Tp). Thereafter, a noise 236 occurs, but since this timing is outside the time window (since the flag is "NG"), the intermediate clock management unit 14 does not perform the intermediate time synchronization. Thereafter, the intermediate clock management unit 14 performs the intermediate time synchronization corresponding to a master clock cycle 237 started in a next time window 336, and sets the intermediate controller time to (Tn+5*Tp).

The processing in a case in which the clock signal 230 is the intermediate clock signal will be described. The clock cycle Tp therefore means an intermediate clock cycle. The reference clock management unit 15 performs the reference time synchronization corresponding to the intermediate clock cycle 231 started in the time window 331, and sets the reference controller time to Tn. The reference clock management unit 15 further performs the reference time synchronization corresponding to the intermediate clock cycle 232 started in the next clock cycle 332, and sets the reference controller time to (Tn+Tp). With respect to the next clock cycle 333, the determination unit 18 determines that the intermediate clock cycle 233 has not started in the clock cycle 333, and the update control unit 19 suspends the reference time synchronization corresponding to the intermediate clock cycle 233. The reference clock management unit 15 performs the reference time synchronization corresponding to the intermediate clock cycle 234 started in the next time window 334, and sets the reference controller time to (Tn+3*Tp). The reference clock management unit 15 performs the reference time synchronization corresponding to the intermediate clock cycle 235 started in the next time window 335, and sets the reference controller time to (Tn+4*Tp). Thereafter, the noise 236 occurs, but since this time point is outside the time window (since the flag is "NG"), the reference clock management unit 15 does not perform the reference time synchronization. Thereafter, the reference clock management unit 15 performs the reference time synchronization corresponding to the intermediate clock cycle 237 started in the next time window 336, and sets the reference controller time to (Tn+5*Tp).

In the example of FIG. 8, in response to determining that the master clock cycle (or intermediate clock cycle) 234 starts in the time window 334, the update control unit 19 may further suspend the time synchronization corresponding to the master clock cycle 234. In this case, the next intermediate time synchronization is performed in the master clock cycle 235 (or the next reference time synchronization is performed in the intermediate clock cycle 235).

In the example of FIG. 7, the clock signal 220 includes the clock cycle 223 that has not started in the time window 323 and the clock cycle 224 that has started in the time window 324. In the example of FIG. 8, the clock signal 230 includes the clock cycle 233 that has not started within the clock cycle 333 and the clock cycle 234 that has started within the time window 334. As in these examples, the clock signal may include a first clock cycle that has not started within a first time window and a second clock cycle that has started within a second time window following the first time window. In some examples, the update control unit 19 may cause the controller clock management unit 12 (the intermediate clock management unit 14 or the reference clock management unit 15) to perform the time synchronization corresponding to the second clock cycle (the clock cycle 224 or 234).

In the example of FIG. 7, the clock signal 220 includes the clock cycle 223 that has not started within the time window 323, the clock cycle 224 that has started within the time window 324, and the clock cycle 225 that has started within the time window 325. In the example of FIG. 8, the clock signal 230 includes the clock cycle 233 that has not started within the clock cycle 333, the clock cycle 234 that has started within the time window 334, and the clock cycle 235 that has started within the time window 335. That is, the clock signal may include a first clock cycle that has not started within a first time window, a second clock cycle that has started within a second time window following the first time window, and a third clock cycle that has started within a third time window following the second time window. In some examples, the update control unit 19 may further suspend the time synchronization corresponding to the second clock cycle (the clock cycle 224 or 234), and cause the controller clock management unit 12 (the intermediate clock management unit 14 or the reference clock management unit 15) to perform the time synchronization corresponding to the third clock cycle (the clock cycle 225 or 235).

In response to the update control unit 19 suspending the time synchronization, the controller clock management unit 12 may perform alternate time synchronization based on the internal cycle without using the clock cycle. As an example, in response to the update control unit 19 suspending the intermediate time synchronization, the intermediate clock management unit 14 may perform a first alternate time synchronization based on the intermediate clock cycle, without using the master clock cycle. As another example, in response to the update control unit 19 suspending the reference time synchronization, the reference clock management unit 15 may perform a second alternate time synchronization based on a cycle of a related interrupt signal, without using the intermediate clock cycle. As described above, the controller clock management unit 12 (the intermediate clock management unit 14 or the reference clock management unit 15) may perform the time synchronization (intermediate time synchronization or reference time synchronization) based on the start time based on the master clock Cm and at least one of the clock cycle and the internal cycle. Alternatively, in response to the time synchronization being suspended, the controller clock management unit 12 may perform the alternative time synchronization based on a value estimated based on the clock cycle.

Program

Each functional module of the host controller 10 is realized by reading a time synchronization program on the processor 111 or the memory 112 and causing the processor 111 to execute the program. The time synchronization program includes codes for realizing each functional module of the host controller 10. The processor 111 operates the input/output port 115 or the communication port 116 according to the time synchronization program, and reads and writes data in the memory 112 or the storage 113. Such processing realizes each functional module of the device control system 1.

The time synchronization program may be provided after being fixedly stored on a non-transitory storage medium such as a CD-ROM, a DVD-ROM, or a semiconductor memory. Alternatively, the time synchronization program may be provided as data signals superimposed on carrier waves via a communication network.

As described above, a controller according to an aspect of the present disclosure includes a master clock; a controller clock; and circuitry, wherein the circuitry is configured to: synchronize the master clock with an external global clock and set a master time based on the master clock; synchronize the controller clock with the master clock and perform time synchronization to synchronize a controller time based on the controller clock with the master time; transmit controller time data indicating the synchronized controller time to at least one local device; set a plurality of time windows corresponding to a plurality of clock cycles of a clock signal for the time synchronization; determine whether one clock cycle of the plurality of clock cycles has started within one time window of the plurality of time windows, the one time window corresponding to the one clock cycle; and suspend the time synchronization corresponding to the one clock cycle, in response to determining that the one clock cycle has not started within the one time window.

A processor-executable method according to an aspect of the present disclosure includes: synchronizing a master clock in a controller with an external global clock and setting a master time based on the master clock; synchronizing a controller clock in the controller with the master clock and performing time synchronization to synchronize a controller time based on the controller clock with the master time; transmitting controller time data indicating the synchronized controller time to at least one local device; setting a plurality of time windows corresponding to a plurality of clock cycles of a clock signal for the time synchronization; determining whether one clock cycle of the plurality of clock cycles has started within one time window of the plurality of time windows, the one time window corresponding to the one clock cycle; and suspending the time synchronization corresponding to the one clock cycle, in response to determining that the one clock cycle has not started within the one time window.

A non-transitory computer-readable storage medium according to an aspect of the present disclosure stores processor-executable instructions to: synchronize a master clock in a controller with an external global clock and set a master time based on the master clock; synchronize a controller clock in the controller with the master clock and performing time synchronization to synchronize a controller time based on the controller clock with the master time; transmit controller time data indicating the synchronized controller time to at least one local device; set a plurality of time windows corresponding to a plurality of clock cycles of a clock signal for the time synchronization; determine whether one clock cycle of the plurality of clock cycles has started within one time window of the plurality of time windows, the one time window corresponding to the one clock cycle; and suspend the time synchronization corresponding to the one clock cycle, in response to determining that the one clock cycle has not started within the one time window.

According to such examples, since the time synchronization is not performed when the start timing of the clock signal of one cycle is not appropriate, it is possible to avoid a situation in which the controller time deviates from the master time and to stabilize the time synchronization.

In some examples, the circuitry may be further configured to: receive global time data indicating a global time based on the external global clock from a time server through non-periodic communication; set the master time based on the global time; and transmit the controller time data to the at least one local device through periodic communication. In this case, the controller time synchronized with the global time acquired through the non-periodic communication is notified or transmitted to the local device through the periodic communication. That is, even when the global time is acquired by non-periodic communication, it is possible to appropriately set the local time in each of the one or more local devices controlled based on the periodic communication.

In some examples, the circuitry may be further configured to: generate a master clock signal corresponding to the master time and having a plurality of master clock cycles, as the clock signal for the time synchronization; determine whether one master clock cycle of the plurality of master clock cycles has started within the one time window; and suspend the time synchronization corresponding to the one master clock cycle, in response to determining that the one master clock cycle has not started within the one time window. By not performing the time synchronization when the start timing of the master clock is not appropriate, it is possible to avoid a situation in which the controller time deviates from the master time, and to stabilize the time synchronization.

In some examples, the controller clock may comprise an intermediate controller clock and a reference controller clock, and the circuitry may be further configured to: synchronize the intermediate controller clock with the master clock based on the master clock signal, perform intermediate time synchronization to set an intermediate controller time based on the intermediate controller clock, and generate an intermediate clock signal corresponding to the intermediate controller time and having a plurality of intermediate clock cycles, as the clock signal for the time synchronization, wherein each of the plurality of intermediate clock cycles is shorter than the master clock cycle; synchronize the reference controller clock with the intermediate controller clock based on the intermediate clock signal, and perform reference time synchronization to synchronize a reference controller time based on the reference controller clock with the intermediate controller time; and transmit the controller time data indicating the synchronized reference controller time as the synchronized controller time, to the at least one local device. By synchronizing the time in the controller with the master time in two stages using the intermediate clock cycle shorter than the master clock cycle, it is possible to more reliably suppress the influence of the fluctuation of the master clock signal and realize robust time synchronization.

In some examples, the circuitry may be further configured to: determine whether one intermediate clock cycle of the plurality of intermediate clock cycles has started within the one time window, and suspend the reference time synchronization corresponding to the one intermediate clock cycle, in response to determining that the one intermediate clock cycle has not started within the one time window. By executing the determination in each of the master clock cycle and the intermediate clock cycle, time synchronization can be more reliably stabilized.

In some examples, the plurality of time windows may include a first time window and a second time window following the first time window, the clock signal may include: a first clock cycle which has not started within the first time window; and a second clock cycle which has started within the second time window, and the circuitry may be further configured to: suspend a first time synchronization corresponding to the first clock cycle; and perform a second time synchronization corresponding to the second clock cycle. In this case, the time synchronization can be promptly resumed at the time when it is estimated that the clock cycle returns to normal.

In some examples, the plurality of time windows may include a first time window, a second time window following the first time window, and a third time window following the second time window, and the clock signal may include:

a first clock cycle which has not started within the first time window; a second clock cycle which has started within the second time window; and a third clock cycle which has started in the third time window, and the circuitry may be further configured to: suspend a first time synchronization corresponding to the first clock cycle; suspend a second time synchronization corresponding to the second clock cycle; and perform a third time synchronization corresponding to the third clock cycle. In this case, since the time synchronization is resumed at the time when it is estimated that the clock cycle is reliably returned to normal, the time synchronization can be more reliably stabilized.

In some examples, the circuitry may be further configured to set, for each of the plurality of clock cycles, a time window corresponding to an estimated start timing of the clock cycle. Since the time window is set for each clock cycle, individual clock cycles can be reliably monitored.

In some examples, the circuitry may be configured to set, for each of the plurality of clock cycles, a time width from a time point before the estimated start timing of the clock cycle to a time point after the estimated start timing, as the time window. By setting the time window in this manner, an appropriate (correct) clock cycle can be reliably acquired.

In some examples, the circuitry may be configured to set an internal cycle of an internal signal corresponding to the controller time as the time width. Since the length of the time window is set in consideration of the cycle of the internal signal, the time synchronization can be controlled so as not to affect the processing based on the internal signal.

In some examples, the circuitry may be configured to, in response to determining that the one clock cycle has started within the one time window, set an end of the one time window based on a start time of the clock cycle. By setting the end of the time window in response to identifying the start of an appropriate (correct) clock cycle, the appropriate clock cycles can continue to be acquired.

In some examples, the circuitry may be configured to: set, for each of the plurality of time windows, a flag indicating whether the time window is set, and refer to the flag at a start time of the clock cycle to determine whether the one clock cycle has started within the one time window. Since it is sufficient to refer to the flag in order to determine whether the clock cycle is appropriate, the determination process can be simplified.

In some examples, the circuitry may be configured to: generate an internal signal corresponding to the controller time and having a plurality of internal cycles, based on the clock cycle; and perform the time synchronization based on a start time and at least one cycle selected from a group comprising the plurality of clock cycles and the plurality of internal cycles, wherein the start time is based on the master clock. By generating the internal signal based on the cycle of the clock signal and performing the synchronization using at least one of both the cycles, accurate time synchronization can be achieved.

In some examples, the circuitry may be further configured to perform alternative time synchronization based on the at least one cycle selected from the plurality of internal cycles without selecting any of the plurality of clock cycles, in response to the time synchronization being suspended. By such processing, the time synchronization can be performed even when an appropriate (accurate) master time cannot be obtained.

In some examples, the circuitry may be configured to generate the internal signal in the internal cycle, wherein each of the plurality of internal cycles may be shorter than the clock cycle. By using this internal signal, it is possible to synchronize the time in the controller with the master time at shorter intervals, and thus it is possible to more reliably suppress the influence of the fluctuation of the clock signal and perform robust time synchronization.

In some examples, the circuitry may be configured to perform the time synchronization further based on an internal delay in the controller. Since the internal delay in the controller is considered, the controller time can be more accurately synchronized with the master time.

In some examples, a device control system may include the controller above, and further comprise at least one local device. In this case, in the device control system, it is possible to avoid a situation in which the controller time deviates from the master time, and to stabilize the time synchronization.

In some examples, at least one of the at least one local device may be a robot controller. In this case, in the device control system having the robot controller, it is possible to avoid a situation in which the controller time deviates from the master time, and to stabilize the time synchronization.

A controller according to another aspect of the present disclosure includes circuitry configured to: synchronize a master clock in the controller with an external global clock, set a master time based on the master clock, and generate a master clock signal corresponding to the master time and having a master clock cycle; synchronize an intermediate controller clock in the controller with the master clock based on the master clock signal, perform intermediate time synchronization to set an intermediate controller time based on the intermediate controller clock, and generate an intermediate clock signal corresponding to the intermediate controller time and having an intermediate clock cycle shorter than the master clock cycle; and synchronize a reference controller clock in the controller with the intermediate controller clock based on the intermediate clock signal, and perform reference time synchronization to set a reference controller time based on the reference controller clock.

A processor-executable method according to another aspect of the present disclosure includes: synchronizing a master clock in the controller with an external global clock, setting a master time based on the master clock, and generating a master clock signal corresponding to the master time and having a master clock cycle; synchronizing an intermediate controller clock in the controller with the master clock based on the master clock signal, performing intermediate time synchronization to set an intermediate controller time based on the intermediate controller clock, and generating an intermediate clock signal corresponding to the intermediate controller time and having an intermediate clock cycle shorter than the master clock cycle; and synchronizing a reference controller clock in the controller with the intermediate controller clock based on the intermediate clock signal, and performing reference time synchronization to set a reference controller time based on the reference controller clock.

A non-transitory computer-readable storage medium according to another aspect of the present disclosure stores processor-executable instructions to: synchronize a master clock in the controller with an external global clock, set a master time based on the master clock, and generate a master clock signal corresponding to the master time and having a master clock cycle; synchronize an intermediate controller clock in the controller with the master clock based on the master clock signal, perform intermediate time synchronization to set an intermediate controller time based on the intermediate controller clock, and generate an intermediate clock signal corresponding to the intermediate controller time and having an intermediate clock cycle shorter than the master clock cycle; and synchronize a reference controller clock in the controller with the intermediate controller clock based on the intermediate clock signal, and perform reference time synchronization to set a reference controller time based on the reference controller clock.

According to such examples, by synchronizing the time in the controller with the master time in two stages using the intermediate clock cycle shorter than the master clock cycle, it is possible to more reliably suppress the influence of the fluctuation of the master clock signal and realize robust time synchronization.

ADDITIONAL EXAMPLES

It is to be understood that not all aspects, advantages and features described herein may necessarily be achieved by, or included in, any one particular example. Indeed, having described and illustrated various examples herein, it should be apparent that other examples may be modified in arrangement and detail is omitted.

In the above examples, the host controller 10 includes two controller clocks, i.e., the intermediate controller clock Ci and the reference controller clock Cr. The host controller 10 may however include the reference controller clock Cr without including the intermediate controller clock Ci. In this example, the controller clock management unit 12 performs the time synchronization including synchronizing the reference controller clock Cr with the master clock Cm based on the master clock signal, and setting the reference controller time based on the reference controller clock Cr.

That is, in some examples, the controller clock may be a reference controller clock, and the circuitry may be further configured to: synchronize the reference controller clock with the master clock based on the master clock signal; perform the time synchronization to set a reference controller time based on the reference controller clock; and transmit the controller time data indicating the synchronized reference controller time as the synchronized controller time, to the at least one local device. Since the intermediate controller clock is omitted, the time synchronization can be stabilized while simplifying the configuration of the controller.

The hardware configuration of the system is not limited to examples in which each functional module is realized by executing a program. In some examples, at least a part of the functional modules described above may be configured by logic circuitry dedicated to carry out the function, or may be configured by an application specific integrated circuit (ASIC) in which the logic circuitry is integrated.

A procedure of the method executed by at least one processor is not limited to the above examples. For example, some of the above-described steps or processing may be omitted, or executed in a different order. Further, two or more of the above-described steps may be combined, or a part of the steps may be modified or deleted. Alternatively, other steps may be performed in addition to the above steps.

In a case where the magnitude relation between two numerical values is compared in a computer system or a computer, either of the two criteria "greater than or equal to" and "greater than" may be used, and either of the two criteria "less than or equal to" and "less than" may be used.

We claim all modifications and variations coining within the spirit and scope of the subject matter claimed herein.

Regarding the above examples, the following appendices are provided by way of further illustration.

(Appendix 1) A controller comprising:
a master clock management unit configured to synchronize a master clock in the controller with an external global clock and set a master time based on the master clock;
a controller clock management unit configured to synchronize a controller clock in the controller with the master clock and perform time synchronization to set a controller time based on the controller clock;
a determination unit configured to determine whether each clock cycle of a clock signal for the time synchronization has started within a given time window; and
an update control unit configured to suspend the time synchronization corresponding to the clock cycle, in response to determining that the clock cycle has not started within the time window.

(Appendix 2) The controller according to appendix 1,
wherein the master clock management unit is configured to:
receive a global time based on the external global clock from a time server through non-periodic communication; and
set the master time based on the global time, and
wherein the controller clock management unit is further configured to transmit the controller time to at least one local device through periodic communication.

(Appendix 3) The controller according to appendix 1 or 2,
wherein the master clock management unit is further configured to generate a master clock signal corresponding to the master time and having a master clock cycle, as the clock signal for the time synchronization,
wherein the determination unit is configured to determine whether each master clock cycle has started within the given time window corresponding to the master clock cycle, and
wherein the update control unit is configured to suspend the time synchronization corresponding to the master clock cycle, in response to determining that the master clock cycle has not started within the corresponding time window.

(Appendix 4) The controller according to appendix 3,
wherein the controller clock comprises an intermediate controller clock and a reference controller clock, and
wherein the controller clock management unit comprises:
an intermediate clock management unit configured to synchronize the intermediate controller clock with the master clock based on the master clock signal, perform first time synchronization (intermediate time synchronization) to set an intermediate controller time based on the intermediate controller clock, and generate an intermediate clock signal corresponding to the intermediate controller time and having an intermediate clock cycle shorter than the master clock cycle, as the clock signal for the time synchronization; and
a reference clock management unit configured to synchronize the reference controller clock with the intermediate controller clock based on the intermediate clock signal, and perform second time synchronization (reference time synchronization) to set a reference controller time based on the reference controller clock.

(Appendix 5) The controller according to appendix 4,
wherein the determination unit is further configured to determine whether each intermediate clock cycle has started within the time window corresponding to the intermediate clock cycle, and
wherein the update control unit is configured to suspend the second time synchronization (reference time synchronization) corresponding to the intermediate clock cycle, in response to determining that the intermediate clock cycle has not started within the corresponding time window.

(Appendix 6) The controller according to appendix 3,
wherein the controller clock is a reference controller clock, and
wherein the controller clock management unit is configured to:
synchronize the reference controller clock with the master clock based on the master clock signal; and
perform the time synchronization to set a reference controller time based on the reference controller clock.

(Appendix 7) The controller according to any one of appendices 1 to 6,
wherein the clock signal includes:
a first clock cycle which has not started within a first time window; and
a second clock cycle which has started within a second time window following the first time window, and
wherein the update control unit is further configured to cause the controller clock management unit to perform the time synchronization corresponding to the second clock cycle.

(Appendix 8) The controller according to any one of appendices 1 to 6,
wherein the clock signal includes:
a first clock cycle which has not started within a first time window;
a second clock cycle which has started within a second time window following the first time window; and
a third clock cycle which has started in a third time window following the second time window, and
wherein the update control unit is further configured to:
further suspend the time synchronization corresponding to the second clock cycle; and
cause the controller clock management unit to perform the time synchronization corresponding to the third clock cycle.

(Appendix 9) The controller according to any one of appendices 1 to 8, further comprising a window setting unit configured to set the time window corresponding to an estimated start timing of each clock cycle.

(Appendix 10) The controller according to appendix 9, wherein the window setting unit is configured to set, as the time window, a time width from a time point before the estimated start timing of the clock cycle to a time after the estimated start timing.

(Appendix 11) The controller according to appendix 10, wherein the window setting unit is configured to set an internal cycle of an internal signal corresponding to the controller time as the time width.

(Appendix 12) The controller according to any one of appendices 9 to 11, wherein the window setting unit is configured to, in response to determining that the clock cycle has started within the time window, set an end of the time window based on a start time of the clock cycle.

(Appendix 13) The controller according to any one of appendices 9 to 12,
wherein the window setting unit is further configured to set a flag indicating whether the time window is set, and
wherein the determination unit is configured to refer to the flag at a start time of the clock cycle to determine whether the clock cycle has started within the time window.

(Appendix 14) The controller according to any one of appendices 1 to 13,
wherein the controller clock management unit is configured to:
generate an internal signal corresponding to the controller time and having a given internal cycle, based on the clock cycle; and
perform the time synchronization based on a start time based on the master clock, and at least one of the clock cycle and the internal cycle.

(Appendix 15) The controller according to appendix 14, wherein the controller clock management unit is further configured to perform alternative time synchronization based on the internal cycle without using the clock cycle, in response to the time synchronization being suspended.

(Appendix 16) The controller according to appendix 14 or 15, wherein the controller clock management unit is configured to generate the internal signal in the internal cycle shorter than the clock cycle.

(Appendix 17) The controller according to any one of appendices 1 to 16, wherein the controller clock management unit is configured to perform the time synchronization further based on an internal delay in the controller.

(Appendix 18) A device control system comprising:
the controller according to any one of appendices 1 to 17; and
at least one local device.

(Appendix 19) The device control system according to appendix 18, wherein at least one of the at least one local device is a robot controller.

(Appendix 20) A time synchronization method comprising:
synchronizing a master clock in the controller with an external global clock and setting a master time based on the master clock;
synchronizing a controller clock in the controller with the master clock and performing time synchronization to set a controller time based on the controller clock;
determining whether each clock cycle of a clock signal for the time synchronization has started within a given time window; and
suspending the time synchronization corresponding to the clock cycle which has not started within the time window.

(Appendix 21) A time synchronization program for causing a computer to execute:
synchronizing a master clock in the controller with an external global clock and setting a master time based on the master clock;
synchronizing a controller clock in the controller with the master clock and performing time synchronization to set a controller time based on the controller clock;
determining whether each clock cycle of a clock signal for the time synchronization has started within a given time window; and
suspending the time synchronization corresponding to the clock cycle which has not started within the time window.

(Appendix 22) A controller comprising:
a master clock management unit configured to synchronize a master clock in the controller with an external global clock, set a master time based on the master clock, and generate a master clock signal corresponding to the master time and having a master clock cycle;
an intermediate clock management unit configured to synchronize an intermediate controller clock in the controller with the master clock based on the master clock signal, perform first time synchronization (intermediate time synchronization) to set an intermediate controller time based on the intermediate controller clock, and generate an intermediate clock signal corresponding to the intermediate controller time and having an intermediate clock cycle shorter than the master clock cycle; and
a reference clock management unit configured to synchronize a reference controller clock in the controller with the intermediate controller clock based on the intermediate clock signal, and perform second time synchronization (reference time synchronization) to set a reference controller time based on the reference controller clock.

(Appendix 23) A time synchronization method, comprising:

synchronizing a master clock in the controller with an external global clock, setting a master time based on the master clock, and generating a master clock signal corresponding to the master time and having a master clock cycle;

synchronizing an intermediate controller clock in the controller with the master clock based on the master clock signal, performing first time synchronization (intermediate time synchronization) to set an intermediate controller time based on the intermediate controller clock, and generating an intermediate clock signal corresponding to the intermediate controller time and having an intermediate clock cycle shorter than the master clock cycle; and synchronizing a reference controller clock in the controller with the intermediate controller clock based on the intermediate clock signal, and performing second time synchronization (reference time synchronization) to set a reference controller time based on the reference controller clock.

(Appendix 24) A time synchronization program for causing a computer to execute:

synchronizing a master clock in the controller with an external global clock, setting a master time based on the master clock, and generating a master clock signal corresponding to the master time and having a master clock cycle;

synchronizing an intermediate controller clock in the controller with the master clock based on the master clock signal, performing first time synchronization (intermediate time synchronization) to set an intermediate controller time based on the intermediate controller clock, and generating an intermediate clock signal corresponding to the intermediate controller time and having an intermediate clock cycle shorter than the master clock cycle; and synchronizing a reference controller clock in the controller with the intermediate controller clock based on the intermediate clock signal, and performing second time synchronization (reference time synchronization) to set a reference controller time based on the reference controller clock.

What is claimed is:

1. A controller comprising:
a master clock;
a controller clock; and
circuitry,
wherein the circuitry is configured to:
synchronize the master clock with an external global clock and set a master time based on the master clock;
synchronize the controller clock with the master clock and perform time synchronization to synchronize a controller time based on the controller clock with the master time;
transmit controller time data indicating the synchronized controller time to at least one local device;
set a plurality of time windows corresponding to a plurality of clock cycles of a clock signal for the time synchronization;
determine whether one clock cycle of the plurality of clock cycles has started within one time window of the plurality of time windows, the one time window corresponding to the one clock cycle; and
suspend the time synchronization corresponding to the one clock cycle, in response to determining that the one clock cycle has not started within the one time window.

2. The controller according to claim 1, wherein the circuitry is further configured to:
receive global time data indicating a global time based on the external global clock from a time server through non-periodic communication;
set the master time based on the global time; and
transmit the controller time data to the at least one local device through periodic communication.

3. The controller according to claim 1, wherein the circuitry is further configured to:
generate a master clock signal corresponding to the master time and having a plurality of master clock cycles, as the clock signal for the time synchronization;
determine whether one master clock cycle of the plurality of master clock cycles has started within the one time window; and
suspend the time synchronization corresponding to the one master clock cycle, in response to determining that the one master clock cycle has not started within the one time window.

4. The controller according to claim 3,
wherein the controller clock comprises an intermediate controller clock and a reference controller clock, and
wherein the circuitry is further configured to:
synchronize the intermediate controller clock with the master clock based on the master clock signal, perform intermediate time synchronization to set an intermediate controller time based on the intermediate controller clock, and generate an intermediate clock signal corresponding to the intermediate controller time and having a plurality of intermediate clock cycles, as the clock signal for the time synchronization, wherein each of the plurality of intermediate clock cycles is shorter than the master clock cycle;
synchronize the reference controller clock with the intermediate controller clock based on the intermediate clock signal, and perform reference time synchronization to synchronize a reference controller time based on the reference controller clock with the intermediate controller time; and
transmit the controller time data indicating the synchronized reference controller time as the synchronized controller time, to the at least one local device.

5. The controller according to claim 4, wherein the circuitry is further configured to:
determine whether one intermediate clock cycle of the plurality of intermediate clock cycles has started within the one time window, and
suspend the reference time synchronization corresponding to the one intermediate clock cycle, in response to determining that the one intermediate clock cycle has not started within the one time window.

6. The controller according to claim 3,
wherein the controller clock is a reference controller clock, and
wherein the circuitry is further configured to:
synchronize the reference controller clock with the master clock based on the master clock signal;
perform the time synchronization to synchronize a reference controller time based on the reference controller clock with the master time; and transmit the controller time data indicating the synchronized reference controller time as the synchronized controller time, to the at least one local device.

7. The controller according to claim 1,
wherein the plurality of time windows includes a first time window and a second time window following the first time window,
wherein the clock signal includes:
    a first clock cycle which has not started within the first time window; and
    a second clock cycle which has started within the second time window, and
wherein the circuitry is further configured to:
    suspend a first time synchronization corresponding to the first clock cycle; and
    perform a second time synchronization corresponding to the second clock cycle.

8. The controller according to claim 1,
wherein the plurality of time windows includes a first time window, a second time window following the first time window, and a third time window following the second time window, and
wherein the clock signal includes:
    a first clock cycle which has not started within the first time window;
    a second clock cycle which has started within the second time window; and
    a third clock cycle which has started in the third time window, and
wherein the circuitry is further configured to:
    suspend a first time synchronization corresponding to the first clock cycle;
    suspend a second time synchronization corresponding to the second clock cycle; and
    perform a third time synchronization corresponding to the third clock cycle.

9. The controller according to claim 1, wherein the circuitry is configured to set, for each of the plurality of clock cycles, a time window corresponding to an estimated start timing of the clock cycle.

10. The controller according to claim 9, wherein the circuitry is configured to set, for each of the plurality of clock cycles, a time width from a time point before the estimated start timing of the clock cycle to a time point after the estimated start timing, as the time window.

11. The controller according to claim 10, wherein the circuitry is configured to set an internal cycle of an internal signal corresponding to the controller time as the time width.

12. The controller according to claim 9, wherein the circuitry is configured to, in response to determining that the one clock cycle has started within the one time window, set an end of the one time window based on a start time of the clock cycle.

13. The controller according to claim 9, wherein the circuitry is configured to:
    set, for each of the plurality of time windows, a flag indicating whether the time window is set, and
    refer to the flag at a start time of the clock cycle to determine whether the one clock cycle has started within the one time window.

14. The controller according to claim 1, wherein the circuitry is configured to:
    generate an internal signal corresponding to the controller time and having a plurality of internal cycles, based on the clock cycle; and
    perform the time synchronization based on a start time and at least one cycle selected from a group comprising the plurality of clock cycles and the plurality of internal cycles, wherein the start time is based on the master clock.

15. The controller according to claim 14, wherein the circuitry is further configured to perform alternative time synchronization based on the at least one cycle selected from the plurality of internal cycles without selecting any of the plurality of clock cycles, in response to the time synchronization being suspended.

16. The controller according to claim 14, wherein the circuitry is configured to generate the internal signal in the internal cycle, wherein each of the plurality of internal cycles is shorter than the clock cycle.

17. The controller according to claim 1, wherein the circuitry is configured to perform the time synchronization further based on an internal delay in the controller.

18. A device control system including the controller according to claim 1, and further comprising at least one local device.

19. A processor-executable method comprising:
    synchronizing a master clock in a controller with an external global clock and setting a master time based on the master clock;
    synchronizing a controller clock in the controller with the master clock and performing time synchronization to synchronize a controller time based on the controller clock with the master time;
    transmitting controller time data indicating the synchronized controller time to at least one local device;
    setting a plurality of time windows corresponding to a plurality of clock cycles of a clock signal for the time synchronization;
    determining whether one clock cycle of the plurality of clock cycles has started within one time window of the plurality of time windows, the one time window corresponding to the one clock cycle; and
    suspending the time synchronization corresponding to the one clock cycle, in response to determining that the one clock cycle has not started within the one time window.

20. A non-transitory computer-readable storage medium storing processor-executable instructions to:
    synchronize a master clock in a controller with an external global clock and set a master time based on the master clock;
    synchronize a controller clock in the controller with the master clock and performing time synchronization to synchronize a controller time based on the controller clock with the master time;
    transmit controller time data indicating the synchronized controller time to at least one local device;
    set a plurality of time windows corresponding to a plurality of clock cycles of a clock signal for the time synchronization;
    determine whether one clock cycle of the plurality of clock cycles has started within one time window of the plurality of time windows, the one time window corresponding to the one clock cycle; and
    suspend the time synchronization corresponding to the one clock cycle, in response to determining that the one clock cycle has not started within the one time window.

* * * * *